Jan. 22, 1946. R. PETTERSON 2,393,563
BELT CONVEYER DRIVE
Filed Dec. 11, 1944 2 Sheets-Sheet 1

INVENTOR.
Reinhardt Petterson
BY
Burgess Ryan & Hicks
ATTORNEYS

Jan. 22, 1946.  R. PETTERSON  2,393,563
BELT CONVEYER DRIVE
Filed Dec. 11, 1944   2 Sheets-Sheet 2
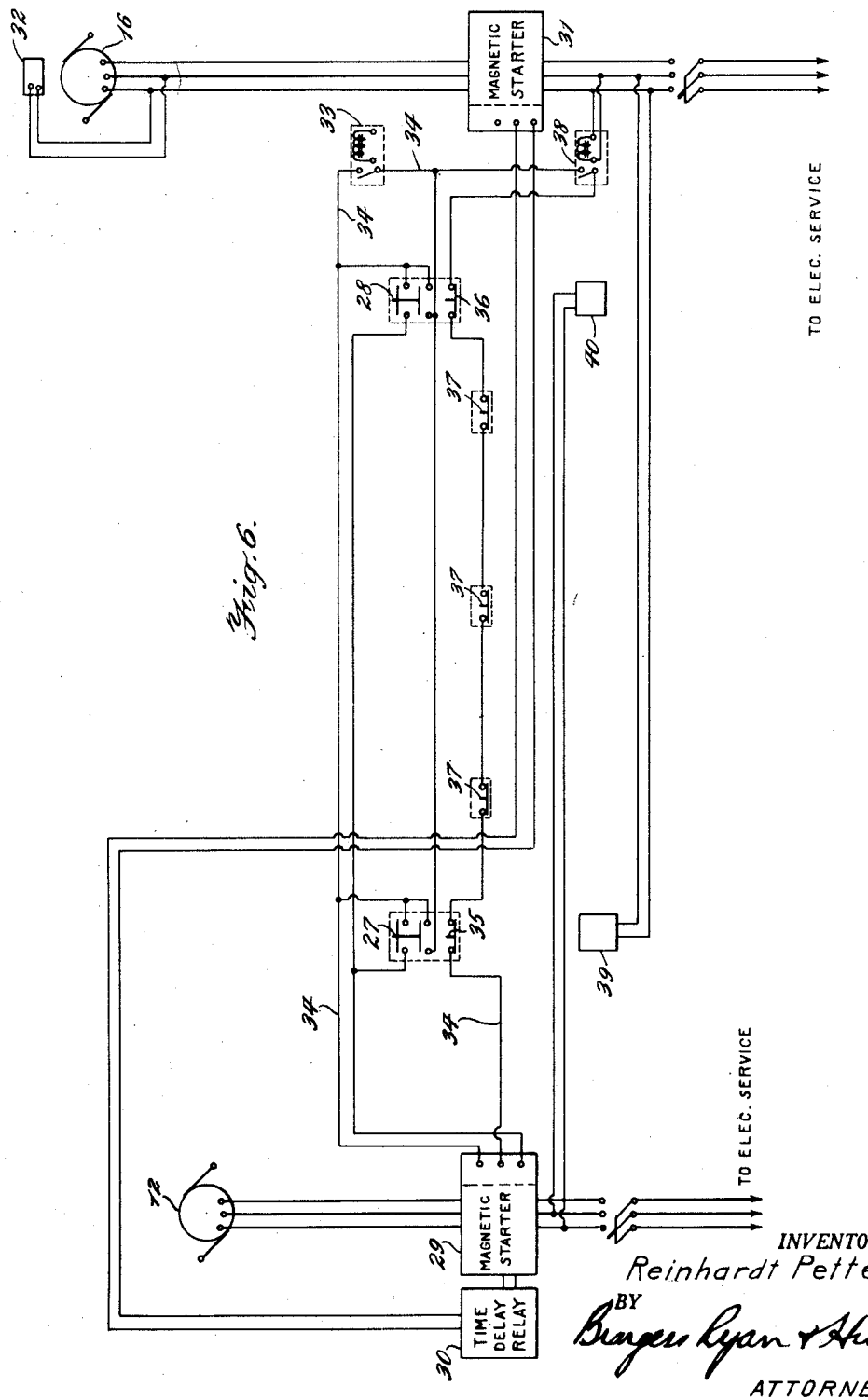
INVENTOR.
Reinhardt Petterson
BY
Burgess Ryan & Hicks
ATTORNEYS Patented Jan. 22, 1946

2,393,563

UNITED STATES PATENT OFFICE 2,393,563

BELT CONVEYER DRIVE

Reinhardt Petterson, Whitestone, N. Y., assignor to Robins Conveyors Incorporated, Passaic, N. J., a corporation of New Jersey Application December 11, 1944, Serial No. 567,577

13 Claims. (Cl. 198—203)

This invention relates to the driving of long conveyer belts, by which is meant belts of an over-all length of as much as several miles.

Various expedients have been resorted to in order to overcome the difficulties attendant upon the development of excessive stresses in such long belts as they have heretofore been attempted to be driven. For instance, in order to withstand the stresses without resort to an excessive number of plies in the belt, special belts have been evolved incorporating steel reinforcing wires but, of course, at a substantial increase in the cost of the belt. More commonly, a number of relatively short belts have been used, each with its own drive, and each dropping the coal, ore, or other material conveyed, from its own discharge end onto the feed end of the succeeding belt. As is well known, however, such an arrangement results in a relatively high rate of wear of the belts as the result of the impact and abrasion of the material as it falls from one belt to the next. Also, and especially where long stretches of the conveyer are required to pass through tunnels, both installation and maintenance are more complicated than where a single belt is employed. Of course, belts can be reinforced by increasing the number of plies in their construction but at the sacrifice of lateral flexibility, which is important to the proper "troughing" of the belt.

The primary object of this invention is a belt conveyer drive so organized as to provide such control over the belt stresses as to avoid the need for resort to the foregoing expedients while permitting the use of extremely long belts having a satisfactory minimum number of plies; that is, satisfactory from the standpoint of initial cost and also from the standpoint of flexibility. Other objects and advantages of the invention will be apparent from the ensuing description and the accompanying drawings.

In the drawings:

Fig. 6 is a typical wiring diagram.

Figure 1:
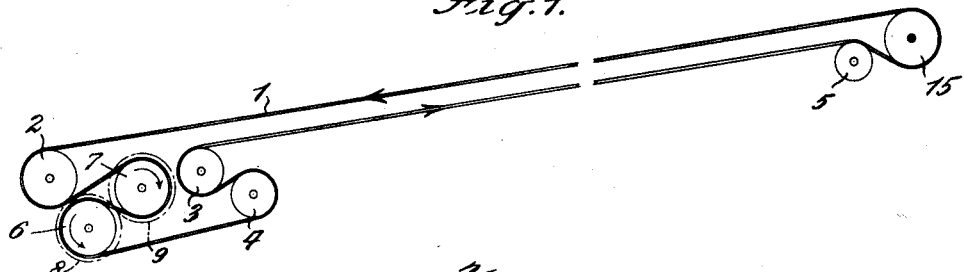
Fig. 1 is a schematic elevational view illustrating a belt conveyer drive embodying the invention.
Figure 2:
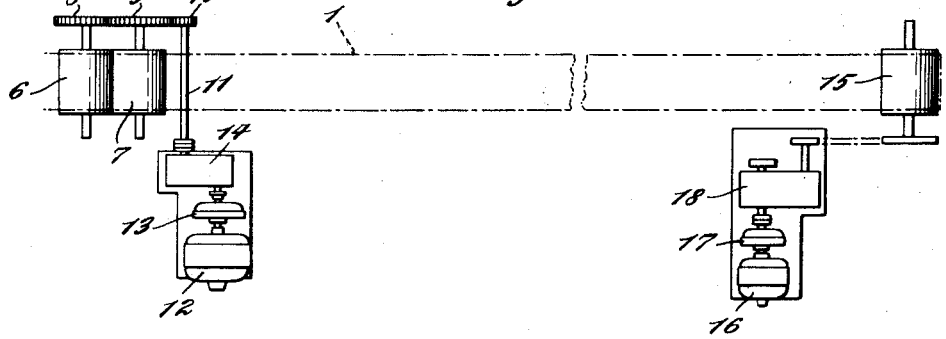
Fig. 2 is a plan view of the drive.

Referring to Figs. 1 and 2 it will be seen that the conveyer belt 1 is driven both at the head end and at the tail end; that is to say, both at the end toward which the top or loaded stretch of the belt advances and also at the end toward which the lower or return stretch of the belt moves. For purposes of illustration the belt is shown trained over idler pulleys 2, 3 and 4 at the head drive end and over idler pulley 5 at the tail drive end. Pulley 4 may be mounted for adjustment to vary the belt tension in the known manner.

In the illustrated preferred form of installation, the head drive comprises tandem pulleys 6 and 7 driven by gears 8, 9 and 10 from shaft 11. An electric motor 12 furnishes the power for the tandem drive and it is transmitted to shaft 11 through a torque limiting coupling 13 and reduction gear mechanism 14. The torque limiting coupling is preferably of the so-called "scoop control" fluid drive type which can be readily set to transmit any desired maximum torque. Being well known, these various elements require no detailed description.

The tail drive comprises a pulley 15 driven by a separate electric motor 16. As before, the transmission from motor 16 to pulley 15 includes a torque limiting coupling 17 and reduction gear mechanism 18. This torque limiting coupling is preferably of the fluid drive type.

Figure 3:
Fig. 3 is a cross-sectional view of a portion of the belt illustrating the troughing of the upper or loaded stretch.

The top stretch of the belt is carried in the usual manner on a series of troughing idlers, such for example as the centrally located rollers 19 and lateral, inclined rollers 20 (Fig. 3) to maintain its desired trough shape while conveying the load. It will be understood that it is the necessity for such "troughing" which prohibits the use of unduly thick and stiff belts.

According to this preferred form of the invention the torque limiting coupling 17 for the tail drive motor is set to limit the tractive force of the tail drive pulley to an amount slightly less than that required to advance the return stretch of the belt. In other words, the tail drive motor is rendered incapable, alone, of moving the return stretch of the belt and is therefore incapable of feeding any of the belt into the top stretch and over-running the head drive.

The head drive motor 12 is arranged to furnish adequate torque to advance the top stretch of the belt and also to supply the additional effort required by the tail drive to effect the advance of the return stretch of the belt. In the preferred arrangement the torque limiting coupling 13 for the head drive motor is set for a torque limit substantially equal to that required to advance the loaded top stretch of the belt plus the difference between that required to advance the return stretch of the belt and the limit torque set by the tail drive coupling 17. By so setting the head drive coupling 13 adequate torque is provided for all conditions encountered during the normal driving of the loaded belt but at the same time the possibility of any excessive tension in the top stretch of the belt due to stoppage caused by accidental obstruction or otherwise is avoided. As below elucidated in connection with the wiring diagram, provision is also made for starting the head drive and tail drive motors seriatim, i. e. first the head drive motor and then the tail drive motor.

Figure 4:
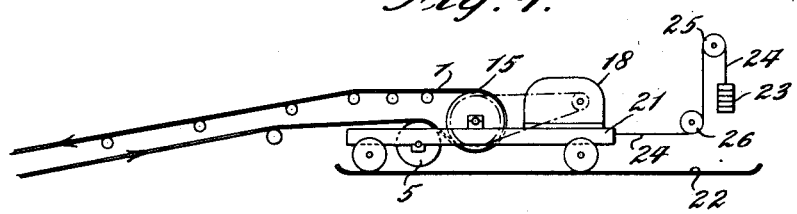
Fig. 4 is a schematic elevational view of a modified form of tail drive.
Figure 5:
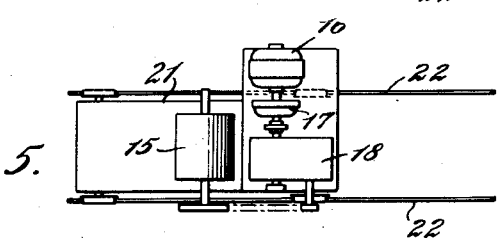
Fig. 5 is a corresponding plan view.

Referring now to the form of installation shown in Figs. 4 and 5, in which corresponding parts are designated by the same reference characters, it will be seen that the entire tail drive (comprising idler pulley 5, drive pulley 15, motor 16, torque limiting coupling 17 and reduction gear mechanism 18) is mounted on a wheeled carriage 21 supported on tracks 22, set parallel to the direction of movement of the belt. The position of the carriage 21 on its tracks and hence the tension of the belt is controlled by a counterweight 23 suspended from a cable 24 trained over pulleys 25, 26 and secured to the rear of the carriage. The head drive may comprise the same elements as above described for the head drive in the form of the invention illustrated in Figs. 1 and 2.

In the form of installation shown in Figs. 4 and 5, it will be recognized that the torque limiting coupling 17 need not be set to limit the tractive force of the tail drive pulley to an amount less than that required to advance the return stretch of the belt, because any tendency of slack to develop at the tail drive end is immediately taken up in this installation by the movement of the entire tail drive on its carriage 21 under the influence of counterweight 23. If, however, the torque limiting coupling 17 should be set, as it may be, as described with reference to the installation of Figs. 1 and 2, the head drive torque limiting coupling 13 will also be set as described with reference to the installation of Figs. 1 and 2; but if, on the other hand, the torque limiting coupling 17 in the installation of Figs. 4 and 5 is set to permit the unaided tail drive motor to advance the return stretch of the belt, the head drive coupling 13 can obviously be set for a lesser maximum torque than is required in the installation of Figs. 1 and 2.

It will be recognized that electrical controls for the foregoing systems can be wired in a variety of ways and that the wiring diagram of Fig. 6 is merely illustrative.

Also, the wiring is virtually self-explanatory and only a brief summary of the operation will be necessary.

In the three-phase motor system illustrated, it will be seen that the system can be put into operation by starter button 27 at the head drive end or by starter button 28 at the tail drive end. When either of these buttons is pressed, the head drive motor 12 is started, through magnetic starter 29. Suitable means is provided to delay the start of the tail drive motor until the head drive motor has reached a predetermined working torque—this for the purpose of first taking the slack out of the upper or loaded stretch of the belt. Such means may, for example, comprise a time delay relay 30 which, after an appropriate interval, energizes magnetic starter 31 and starts the tail drive motor 16. Coincidentally the magnetic brake 32, automatically operative when the current is off, is energized and thereby released. Also, a holding relay 33 is energized to close the stop circuit generally designated 34, whereupon the starter button may be released.

The stop circuit 34 is shown subject to control by a number of switches such as 35 at the head drive end of the system, 36 at the tail drive end, and intermediate switches 37 appropriately located at points along the conveyer line. The stop circuit is also shown controlled by a safety relay 38 which automatically opens the circuit in response to current failure.

Various audible or visible indicators may be incorporated in the system for the purpose of keeping the attendants at each end of the drive fully informed as to the operating conditions at the other end. For instance, at the head drive end there is shown a single drop annunciator 39 which is bridged across the tail drive motor leads and thereby indicates when no current is flowing to such motor. A similar annunciator 40 is shown at the tail drive end bridged across the head drive motor leads and serves to indicate to the attendant at the tail drive end when no current is flowing to the head drive motor.

In the light of the foregoing description, the following is claimed:

1. The combination with a continuous belt conveyer of tandem drive pulleys therefor at the head end of the conveyer, a torque limiting hydraulic coupling, a head drive electric motor coupled to said pulleys through said coupling, a drive pulley at the tail end of the conveyer, a second torque limiting hydraulic coupling, a tail drive electric motor coupled to the tail drive pulley through said second coupling, said first-mentioned coupling being set to impose a predetermined limit to the tension imparted to the top stretch of the belt by the head drive motor, and said second coupling being set to limit the tractive force of the tail drive pulley to an amount less than that required to advance the return stretch of the belt, control means for starting said head and tail drive motors seriatim, a brake for said tail drive pulley, and means for coincidentally shutting off the power to said motors and applying said brake.

2. The combination with a continuous belt conveyer of tandem drive pulleys therefor at the head end of the conveyer, a torque limiting hydraulic coupling, a head drive electric motor coupled to said pulleys through said coupling, a drive pulley at the tail end of the conveyer, a second torque limiting hydraulic coupling, a tail drive electric motor coupled to the tail drive pulley through said second coupling, said first-mentioned coupling being set to impose a predetermined limit to the tension imparted to the top stretch of the belt by the head drive motor, and said second coupling being set to limit the tractive force of the tail drive pulley to an amount less than that required to advance the return stretch of the belt, and control means for starting said head and tail drive motors seriatim.

3. The combination with a continuous belt conveyer, of tandem drive pulleys therefor at the head end of the conveyer, a head drive electric motor coupled to said pulleys, a tail drive belt pulley, a torque limiting coupling, a tail drive electric motor coupled to the tail drive pulley through said coupling, the latter being set to limit the tractive force of the tail drive pulley to an amount less than that required to advance the return stretch of the belt, a brake for said tail drive pulley and means for coincidentally shutting off the power to the motors and applying said brake.

4. The combination with a continuous belt conveyer, of tandem drive pulleys therefor at the head end of the conveyer, a head drive electric motor coupled to said pulleys, a tail drive belt pulley, a torque limiting coupling, a tail drive electric motor coupled to the tail drive pulley through said coupling, the latter being set to limit the tractive force of the tail drive pulley to an amount less than that required to advance the return stretch of the belt, and control means for said motors.

5. The combination with a continuous belt conveyer, of a head drive pulley, a torque limiting coupling, a head drive motor coupled to said pulley through said coupling, a tail drive pulley, a second torque limiting coupling, a tail drive motor coupled to the tail drive pulley through said second coupling, said first-mentioned coupling being set to impose a predetermined limit to the tension imparted to the top stretch of the belt by the head drive motor, said second coupling being set to limit the tractive force of the tail drive pulley to an amount less than that required to advance the return stretch of the belt, control means for starting said motors, a brake for said tail drive pulley, and means for coincidentally shutting off the power to said motors and applying said brake.

6. The combination with a continuous belt conveyer, of a head drive pulley, a torque limiting coupling, a head drive motor coupled to said pulley through said coupling, a tail drive pulley, a second torque limiting coupling, a tail drive motor coupled to the tail drive pulley through said second coupling, said first-mentioned coupling being set to impose a predetermined limit to the tension imparted to the top stretch of the belt by the head drive motor, said second coupling being set to limit the tractive force of the tail drive pulley to an amount less than that required to advance the return stretch of the belt, and control means for said motors.

7. The combination with a continuous belt conveyer, of a head drive pulley, a head drive motor coupled thereto, a tail drive pulley, a torque limiting coupling, a tail drive motor coupled to the tail drive pulley through said coupling, the latter being set to limit the tractive force of the tail drive pulley to an amount less than that required to advance the return stretch of the belt, a brake for said tail drive pulley, and means for coincidentally shutting off the power to the motors and applying said brake.

8. The combination with a continuous belt conveyer, of a head drive pulley, a head drive motor coupled thereto, a tail drive pulley, a torque limiting coupling, a tail drive motor coupled to the tail drive pulley through said coupling, the latter being set to limit the tractive force of the tail drive pulley to an amount less than that required to advance the return stretch of the belt, and control means for said motors.

9. The combination with a continuous belt conveyer, of a head drive pulley, a head drive motor coupled thereto, a tail drive pulley, a torque limiting coupling, a tail drive motor coupled to the tail drive pulley through said coupling, the latter being set to limit the tractive force of the tail drive pulley to an amount less than that required to advance the return stretch of the belt, and counterweighted means supporting said tail drive pulley, coupling and tail drive motor for bodily movement in a direction to maintain a predetermined belt tension.

10. The combination with a continuous belt conveyer, of a head drive pulley, a torque limiting coupling, a head drive motor coupled to said pulley through said coupling, a tail drive pulley, a second torque limiting coupling, a tail drive motor coupled to the tail drive pulley through said second coupling, said second coupling being set for a torque limit less than that required to advance the return stretch of the belt, and said first coupling being set for a torque limit substantially equal to that required to advance the loaded top stretch of the belt plus the difference between that required to advance the return stretch of the belt and the limit torque of the said second coupling.

11. The combination with a continuous belt conveyer of tandem drive pulleys therefor at the head end of the conveyer, a torque limiting hydraulic coupling, a head drive electric motor coupled to said pulleys through said coupling, a drive pulley at the tail end of the conveyer, a second torque limiting hydraulic coupling, a tail drive electric motor coupled to the tail drive pulley through said second coupling, said first-mentioned coupling being set to impose a predetermined limit to the tension imparted to the top stretch of the belt by the head drive motor, and said second coupling being set to limit the tractive force of the tail drive pulley, control means for starting said head and tail drive motors seriatim, a brake for said tail drive pulley, and means for coincidentally shutting off the power to said motors and applying said brake.

12. The combination with a continuous belt conveyer of tandem drive pulleys therefor at the head end of the conveyer, a torque limiting hydraulic coupling, a head drive electric motor coupled to said pulleys through said coupling, a drive pulley at the tail end of the conveyer, a second torque limiting hydraulic coupling, a tail drive electric motor coupled to the tail drive pulley through said second coupling, said first-mentioned coupling being set to impose a predetermined limit to the tension imparted to the top stretch of the belt by the head drive motor, and said second coupling being set to limit the tractive force of the tail drive pulley, and control means for starting said head and tail drive motors seriatim.

13. The combination with a continuous belt conveyer, of a head drive pulley, a torque limiting coupling, a head drive motor coupled to said pulley through said coupling, a tail drive pulley, a second torque limiting coupling, a tail drive motor coupled to the tail drive pulley through said second coupling, said first-mentioned coupling being set to impose a predetermined limit to the tension imparted to the top stretch of the belt by the head drive motor, said second coupling being set to limit the tractive force of the tail drive pulley, control means for starting said motors, a brake for said tail drive pulley, and means for coincidentally shutting off the power to said motors and applying said brake.

REINHARDT PETTERSON.